(12) United States Patent
Nelson et al.

(10) Patent No.: US 10,200,546 B2
(45) Date of Patent: Feb. 5, 2019

(54) METHODS AND APPARATUS TO IDENTIFY MEDIA USING HYBRID HASH KEYS

(71) Applicant: The Nielsen Company (US), LLC, New York, NY (US)

(72) Inventors: Daniel Nelson, Tampa, FL (US); Donald Miner, Severna Park, MD (US)

(73) Assignee: The Nielsen Company (US), LLC, New York, NY (US)

( * ) Notice: Subject to any disclaimer, the term of this patent is extended or adjusted under 35 U.S.C. 154(b) by 285 days.

(21) Appl. No.: 14/866,755

(22) Filed: Sep. 25, 2015

(65) Prior Publication Data

US 2017/0093854 A1 Mar. 30, 2017

(51) Int. Cl.
*H04L 9/08* (2006.01)
*H04N 1/00* (2006.01)

(52) U.S. Cl.
CPC ..................... *H04N 1/00* (2013.01)

(58) Field of Classification Search
CPC .... G06F 21/10; G06F 17/30858; G06F 21/64; H04L 9/3236
See application file for complete search history.

(56) References Cited

U.S. PATENT DOCUMENTS

| | | | | |
|---|---|---|---|---|
| 6,005,503 A | * | 12/1999 | Burrows | H03M 7/40 341/67 |
| 8,180,712 B2 | * | 5/2012 | Nelson | H04H 60/32 706/1 |
| 2002/0178410 A1 | * | 11/2002 | Haitsma | G06F 17/30787 714/709 |
| 2005/0154899 A1 | * | 7/2005 | Marvel | G06F 21/64 713/187 |
| 2006/0094460 A1 | * | 5/2006 | Tiedemann, Jr. | H04W 52/08 455/522 |
| 2008/0126420 A1 | * | 5/2008 | Wright | H04N 21/845 |
| 2015/0078386 A1 | * | 3/2015 | Jackson | H04L 45/7453 370/392 |
| 2016/0191530 A1 | * | 6/2016 | Jain | H04L 63/101 726/4 |

* cited by examiner

*Primary Examiner* — Maung T Lwin
*Assistant Examiner* — Lizbeth Torres-Diaz
(74) *Attorney, Agent, or Firm* — Hanley, Flight and Zimmerman, LLC

(57) ABSTRACT

Methods and apparatus are disclosed to identify media using hash keys. An example disclosed method includes generating a hash key based on first samples of media. In the disclosed example method, the first samples corresponds to a portion of the media sampled in a buffer of a computing device. The example method also includes applying a blurring function to the hash key to generate a blurred hash key. The example method also includes generating first confirmation data based on second samples of the media. The example method also includes storing the blurred hash key in association with the first confirmation data and first reference data in a memory separate from the buffer of the sampled media. In the example methods, the reference data identifies the portion of the media.

18 Claims, 10 Drawing Sheets

US 10,200,546 B2

METHODS AND APPARATUS TO IDENTIFY MEDIA USING HYBRID HASH KEYS

FIELD OF THE DISCLOSURE

This disclosure relates generally to audience measurement and, more particularly, to methods and apparatus to identify media using hash keys.

BACKGROUND

Audience measurement of media, such as television, music, movies, radio, Internet websites, streaming media, video games, etc., is typically carried out by monitoring media exposure of panelists that are selected to represent a particular demographic group. The captured media exposure data is processed using various statistical methods to determine audience size and demographic composition(s) for programs of interest. The audience size and demographic information is valuable to advertisers, broadcasters and/or other entities. For example, audience size and demographic information may be used as factors in selecting the placement of advertisements, and may be used as factors in valuing commercial time slots during a particular program.

DETAILED DESCRIPTION

Figure 1:
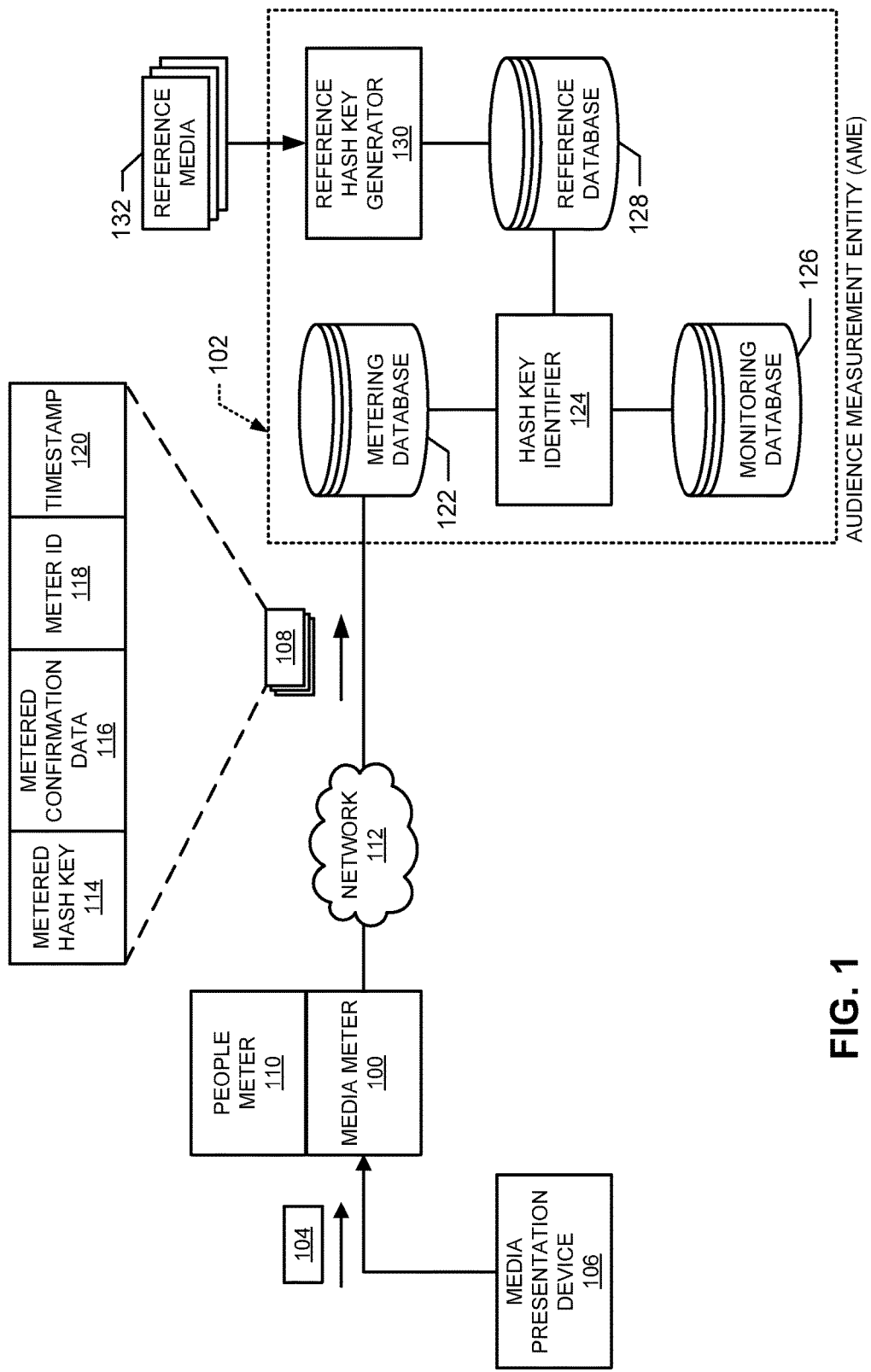
FIG. 1 illustrates an example system constructed in accordance with the teachings of this disclosure and having a media meter in communication with an audience measurement entity to monitor media presentations.

Examples disclosed herein may be used to identify media (e.g., movies, music, television programs, radio programming, television advertisements, radio advertisements, video games, etc.) using hash keys associated with the media. To create indexable identifiers for portions of media of interest, in examples disclosed herein, the media is sampled at a particular frequency (e.g., 15 kHz, 30 kHz, 64 kHz, etc.). Using one or more fingerprinting techniques, such as robust audio hashing, hash keys are generated based on the samples of the media. In some robust audio hashing examples, binary values represent differences in energy between frequency bands of a sample. In some such examples, a hash key has a length in bits corresponding to the number of energy bands used to create the hash key (e.g., a 64-bit length hash key corresponds to the differences between 65 energy bands). Samples of the media may be hashed, for example, in accordance with the techniques described by Haitsma et al. in an article entitled, "Robust Audio Hashing for Content Identification."

To generate reference hash keys, a reference version of media is sampled at a sampling frequency (e.g., 15 kHz, 30 kHz, 64 kHz, etc.). In some examples, reference media is media (e.g., a song, a television program, a radio program, a video and/or audio spot or clip, an advertisement, streaming media, etc.) that has the same or higher quality than media typically obtained by and/or presented to a user. In some examples, the reference media is free from noise (e.g., white noise, pink noise, brown noise, etc.) and/or is stored and/or decoded using a lossless format (e.g., Free Lossless Audio Codec (FLAC), Waveform Audio File Format (WAV), Apple® Lossless Audio Codec (ALAC), etc.). For example, a reference version (or reference media) of audio (e.g., collected in a controlled environment, such as a studio) may be a high quality, lossless digital copy of the song relative to whereas a streamed version (e.g., measured media) of the same audio will typically exhibit lower quality and less accuracy in its reproduction and playback due to environmental noise, transmission losses, etc.

In some examples, an audience measurement entity (AME) contacts and/or enlists panelists using any desired methodology (e.g., random selection, statistical selection, phone solicitations, Internet advertisements, surveys, advertisements in shopping malls, product packaging, etc.). Demographic information (e.g., gender, occupation, salary, race and/or ethnicity, marital status, highest completed education, current employment status, etc.) is obtained from a panelist when the panelist joins (i.e., registers for) a panel. Additionally or alternatively, demographic information may be obtained through other methods during an enrollment process (e.g., via a telephone interview, by having the panelist complete an online survey, etc.). In some examples, the AME provides a media meter (e.g., a set top meter, a personal portable meter (PPM), an on-device meter, a portable media player meter, etc.) to the panelist after the panelist enrolls into the panel.

In some examples, the media meters collect metered samples by sampling media from media sources that are within sufficient detection proximity to the meter. For example, a set top meter may sample audio from a movie presented via a media presentation device, such as a television located in the same room as the set top meter, or a portable media player meter may sample audio presented via a media presentation device such as a portable media player (e.g., an MP3 player, an Apple® iPod®, etc.). In some examples, the sample is captured using a microphone of the media meter. In some examples, the media meter obtains the metered sample through a wired connection (e.g., to an audio out jack) via a splitter or an in-line configuration via which the media meter intercepts portions of the media as they are communicated between a media source and headphones, etc. In some examples, the media samples are sampled by the media meters at the same frequency as the reference samples were sampled. In some examples, the metered samples are sent to a central office of the AME where metered hash keys are generated based on the metered samples. In some examples, the media meter is provided with a hash key generator to locally generate metered hash keys. In some such examples, the media meter sends metered hash keys to the central office.

In examples disclosed herein, a reference record is constructed by generating a reference hash key for a sample of reference media. In some examples, the reference hash key may be 40-bits long or 64-bits long. Metadata (e.g., the name of the corresponding media, a time and/or offset in the media corresponding to the sample, etc.) related to the sample is stored in the reference record in association with the reference hash key. The reference records also includes confirmation data that corresponds to the reference hash key. The confirmation data is another sample of the reference media that is related to the sample used to generate the reference hash key. For example, the confirmation data may be 32-bits of the reference media sample that immediately follow the sample used to generate the reference hash key. In some examples, a blurring function is applied to the reference hash key. The blurring function reduces the specificity of the reference hash key in order to increase error tolerance of the reference hash key. Because the specificity of the reference hash key is reduced, one of the reference hash keys may be associated with multiple sets of metadata. Additionally, in some examples, samples of more than one of the media may, by coincidence, produce the same reference hash key. In such examples, the confirmation data is used to distinguish between identical reference hash keys.

Errors may arise in the media presentation before the media presentation is sampled by a media meter. For example, converting media from a lossless format (e.g., Free Lossless Audio Codec (FLAC), Waveform Audio File Format (WAV), Apple® Lossless Audio Codec (ALAC), etc.) to a lossy format (e.g., MPEG Audio Layer III (MP3), Advanced Audio Coding (AAC), Ogg Vorbis, etc.) may change the media sufficiently so that a metered hash key generated based on a portion (e.g., a segment) of the lossy-format media is different from a reference hash key corresponding to a non-lossy format of the same portion (e.g., the same segment) of the media. Additionally or alternatively, ambient noise and/or attenuation may also introduce errors into samples of the measured media. Transmission errors may also be a source of errors in metered hash keys. These sources of noise, loss and/or error may cause one or more bits of the metered hash key to be different relative to a corresponding reference hash key.

In some examples, the blurring function may set one or more of the least significant bits in each byte of the reference hash key to zero because the least significant bit(s) of the bytes that make up the hash key are most prone to noise during the hash key generating process. In some examples, the number of bits set to zero depends on the byte-length of the reference hash key. For example, if the reference hash key is 40-bits long, the blurring function may set the least significant bit of each byte to zero. Alternatively, for example, if the reference hash key is 64-bits long, the blurring function may set the two least significant bits of each byte to zero. For example, by blurring the least significant bit, if the generated reference hash key is 0x 0D 73 E1 BD (binary: 00001101 01110011 11100001 10111101), the blurred reference hash key would be 0x 0C 72 E0 BC (binary: 00001100 01110010 11100000 10111100).

In examples disclosed herein, the media meter generates metered hash keys and corresponding confirmation data. In such examples, the confirmation data generated by the media meter has the same length and offset as the confirmation data generated for the reference hash keys. In some examples, the media meter blurs the generated metered hash keys using the same blurring function applied to the reference hash keys to the generated metered hash keys. Alternatively, in some examples, the media meter sends the metered hash keys without applying the blurring function and the blurring function is applied to the generated metered hash keys before the metered hash key is compared to the reference hash keys.

In examples disclosed herein, the AME receives metered hash keys and corresponding confirmation data from the media meter and compares the metered hash keys to reference hash keys in the reference hash table. If a metered hash key is found in the reference hash table, the confirmation data corresponding to the metered hash key is compared to the confirmation data corresponding to the reference hash key. If the confirmation data corresponding to the metered hash key matches the confirmation data corresponding to the reference hash key, an impression for corresponding media (e.g., reference media corresponding to the matching reference hash key) is logged. In some examples, metadata corresponding to the reference hash key is retrieved from a corresponding reference record, and the metadata is stored in association with the logged impression. In some examples, information (e.g., demographics, panelist ID, etc.) associated with one or more panelists and/or a timestamp indicative of a time at which the metered media was presented is stored in association with the logged impression.

In examples disclosed herein, when the metered hash key is compared to the reference hash keys in the reference hash key table, multiple candidate reference hash keys may exist. For example, when the reference hash keys are generated, the least significant bit is blurred. As such, a reference hash key of 0x0C 72 E0 BC may correspond to the following non-blurred reference hash keys: 0x0C 73 E0 BC, 0x0D 73 E0 BC, 0x0D 72 E0 BC, 0x0C 72 E0 BD, 0x0C 73 E0 BD, 0x0D 73 E0 BD, 0x0D 72 E0 BD, 0x0C 72 E1 BD, 0x0C 73 E1 BD, 0x0D 73 E1 BD, 0x0D 72 E1 BD, 0x0C 72 E1 BC, 0x0C 73 E1 BC, 0x0D 73 E1 BC, and 0x0D 72 E1 BC. In such examples, when multiple candidate reference hash keys exist in the reference hash key table, the confirmation data corresponding to the metered hash key is compared to the confirmation data corresponding to the reference hash keys. In some such examples, error levels are calculated between the confirmation data corresponding to the metered hash key and the confirmation data corresponding to the reference hash keys. In such examples, metered hash key is determined to match the reference hash key that has the lowest error level that satisfies (e.g., is less than, etc.) an error threshold.

FIG. 1 illustrates an example system constructed in accordance with the teachings of this disclosure and having the media meter 100 in communication with the AME 102 to monitor media 104 presented by the media presentation device 106. In the illustrated example, the media meter 100 samples the example media 104 output by the example media presentation device 106 and generates example exposure records 108. In some examples, a people meter 110 is associated with the media meter 100 to identify persons in the audience at the time the exposure records 108 are collected. In some examples, people identification data collected by the people meter 110 is returned with the exposure records 108. From time to time, the example media meter 100 sends the example exposure records 108 to the example AME 104 via an example network 112 (e.g., the Internet, a local area network, a wide area network, etc.) via wired and/or wireless connections (e.g., a cable/DSL/satellite modem, a cell tower, etc.).

In the illustrated example, the exposure records 108 include an example metered hash key 114, example metered confirmation data 116, an example media meter identifier (ID) 118, and an example timestamp 120. In some examples, the exposure records 108 also include identifiers associated with the persons in the audience as detected by the people meter(s) 110. The example metered hash key 114 is a value that characterizes a portion of the media 104 or is representative of a portion of the media 104 at a certain point in time (e.g., as indicated by the timestamp 120) of the media 104. In some examples, the metered hash key 114 is taken from a stream of the media 104. Alternatively, in some examples, the stream of media 104 is preprocessed by a signature generation engine that hashes the stream of the media 104. In such examples, the metered hash key 114 is taken from the hashed stream of the media 104. In some examples, the media meter 100 applies a blurring function after generating the hash key 114. In such examples, the blurring function sets a number of least significant bits in each byte of the hash key 114 to zero.

The example metered confirmation data 116 includes a number of bits of the media 104 offset from an end of the metered hash key 114 by a number of bits. For example, the metered confirmation data 116 may include twenty-four bits corresponding to a subsequent portion of the media 104 following the portion of the media 104 corresponding to the metered hash key 114. In the illustrated example, the media meter ID 118 is an alphanumeric value which identifies (preferably uniquely) the media meter 100 and/or one or more of the people associated with the people meter 110. The example timestamp 120 corresponds to a time when the portion of the media 104 represented by the metered hash key 114 is presented by the example media presentation device 106.

The AME 102 of the illustrated example includes an example metering database 122, an example hash key identifier 124, an example monitoring database 126, an example reference database 128, and an example reference hash key generator 130. The example exposure records 108 are collected and stored in the example metering database 122.

As disclosed in more detail in FIG. 5 below, the example hash key identifier 124 compares the exposure records 108 to reference records in the reference database 128 to identify the portion of the media 104 corresponding to the metered hash key 114. When one of the exposure records 108 corresponds to one of the reference records, the example hash key identifier 124 generates an impression. The impression associates the media meter ID 118 and/or the timestamp 120 to the portion of the media 104 (e.g., as a media segment ID) and/or metadata identifying the portion of the media 104 corresponding to the matching reference record.

As discussed in more detail in FIG. 2 below, the reference hash key generator 130 samples the reference media 132 (e.g., media that has the same or higher quality than media 104 obtained by and/or presented to a user) to generate the reference hash keys. In some examples, the reference hash key generator 130 applies the burring function to the reference hash key. The example reference hash key generator 130 also generates reference confirmation data using the same size and offset as the media meter 100 uses to generate the metered confirmation data 116. The example reference hash key generator 130 creates reference records that include the reference hash key and corresponding reference confirmation data. In the illustrated examples, the example reference hash key generator 130 stores the generated reference records created based on the reference hash keys in the example reference database 128. In some examples, the reference hash key generator 130 does not create the reference confirmation data for particular ones of the reference hash keys at the beginning and/or at the end of the reference media 132 because there are not enough samples of the reference media 132 to generate the reference confirmation data.

Figure 2:
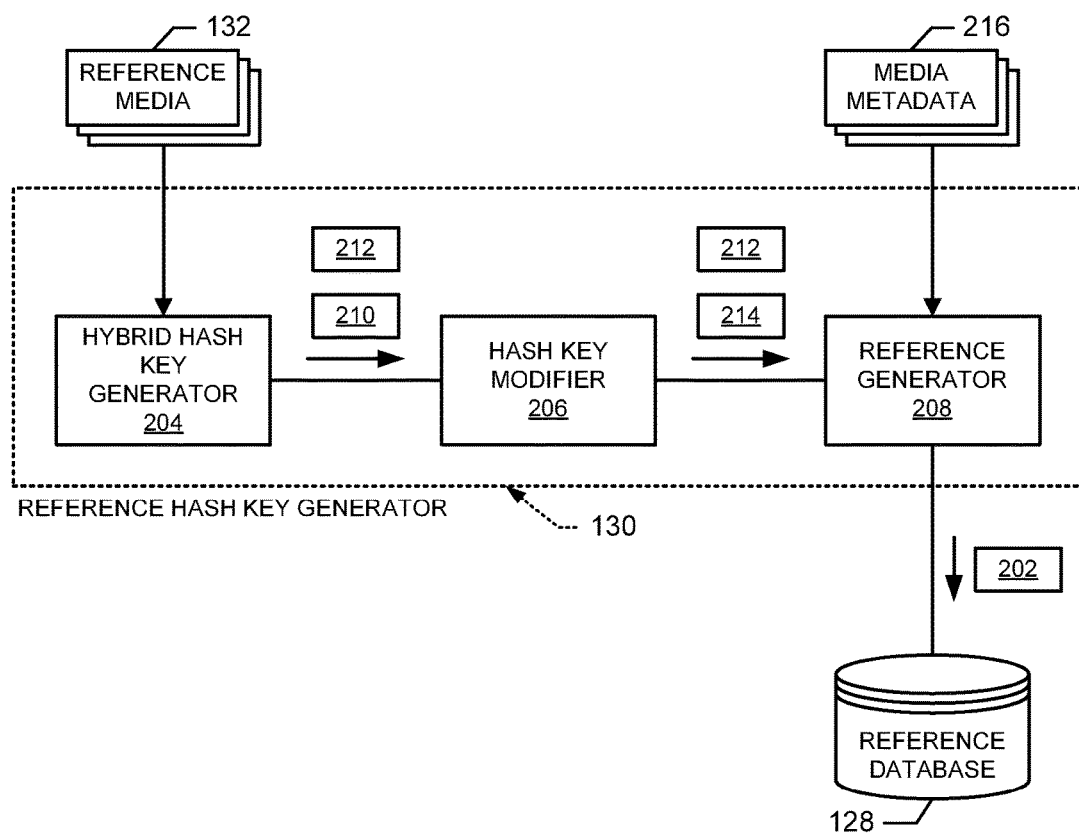
FIG. 2 illustrates the example reference hash key generator of FIG. 1 which may be used to generate the example reference records of FIGS. 3A and/or 3B.

FIG. 2 illustrates an example implementation of the example reference hash key generator 130 of FIG. 1. The example reference hash key generator 130 generates reference records 202 to be stored in the example reference database 128. The example reference hash key generator 130 includes an example hybrid hash key generator 204, an example hash key modifier 206, and an example reference generator 208. The example hybrid hash key generator 204 samples the reference media 130 at a sampling frequency (e.g., 16 kHz, 32 kHz, 64 kHz, etc.).

The example hybrid hash key generator 204 generates reference hash keys 210 based on the samples. The example reference hash keys 210 are representative of a particular portion of the reference media. The example reference hash keys 210 are used as an index to identify the corresponding portion of the reference media when compared to metered hash keys. Additionally, the example hybrid hash key generator 204 generates reference confirmation data 212 based on the samples. The example hybrid hash key generator 204 uses a size (e.g., in bytes) and an offset to determine which samples are to be used for the reference confirmation data 212. For example, the reference confirmation data 212 may have a size of twenty-four bits and an offset of two bits. In such an example, because the offset is two bits, the reference confirmation data 212 begins at two bits from the end of the reference hash key 210 to which the reference confirmation data 212 corresponds. In some examples in which the offset is a negative number, the reference confirmation data 212 overlaps with the corresponding reference hash key 210. The size and the offset are defined by the example AME 102 (FIG. 1) so that the size and offset used by the example hybrid hash key generator 204 are the same as the size and the offset used by the example media meter 100 (FIG. 1) to generate there metered hash key 114 and the metered confirmation data 116 of the exposure record 108 (FIG. 1).

In some examples, when the size and the offset specify samples that are not generated for the reference media 132 (e.g., at the end of the reference media 132), the hybrid hash key generator 204 does not generate the reference confirmation data 212. For example, if the size and the offset specify that 32-bits of the samples of the reference media 132 after the reference hash key 210 are to be used to generate the reference confirmation data 212 and only 16-bits remain until the end of the reference media 132, the hybrid hash key generator 204 may not generate the reference confirmation data 212. In some such examples, the hybrid hash key generator 204 may instead generate the reference confirmation data 212 with a placeholder value (e.g., 0x00 00 00 00, 0xFF FF FF FF, 0xAA AA AA AA, etc.).

The example hash key modifier 206 applies the blurring function to the reference hash key 210 to generate a blurred reference hash key 214. The blurring function sets a number of the least significant bits of each byte of the reference hash key 210 to zero. In some examples, the number of bits that the hash key modifier 206 sets to zero depends on the bit-length of the reference hash key 210. For example, longer metered hash keys 114 represent a greater degree of precision (e.g., 64-bits representing a portion of the media instead of 40-bits, etc.), but are also more likely to have least significant bits subject to noise. For example, if the reference hash key 210 is 40-bits long, the hash key modifier 206 may set the least significant bit of each byte of the reference hash key 210 to zero. Alternatively, for example, if the reference hash key 210 is 64-bits long, the hash key modifier 206 may set the two least significant bits of each byte of the reference hash key 210 to zero. For example, if the reference hash key 210 is 0x 37 01 D2 02 2B 3D 5D 76 and if the least significant bit of each byte are set to zero, the blurred reference hash key is 0x 36 00 D2 02 2A 3C 5C 76. As another example, if the reference hash key 210 is 0x 37 01 D2 02 2B 3D 5D 76 and if the two least significant bits of each byte are set to zero, the blurred reference hash key is 0x 34 00 D0 00 28 3C 5C 74. By applying the blur function, the example hash key modifier 206 makes the blurred reference hash key 214 less precise than the reference hash key 210, but also makes the blurred reference hash key 214 more error tolerant than the reference hash key 210.

Figure 3A:
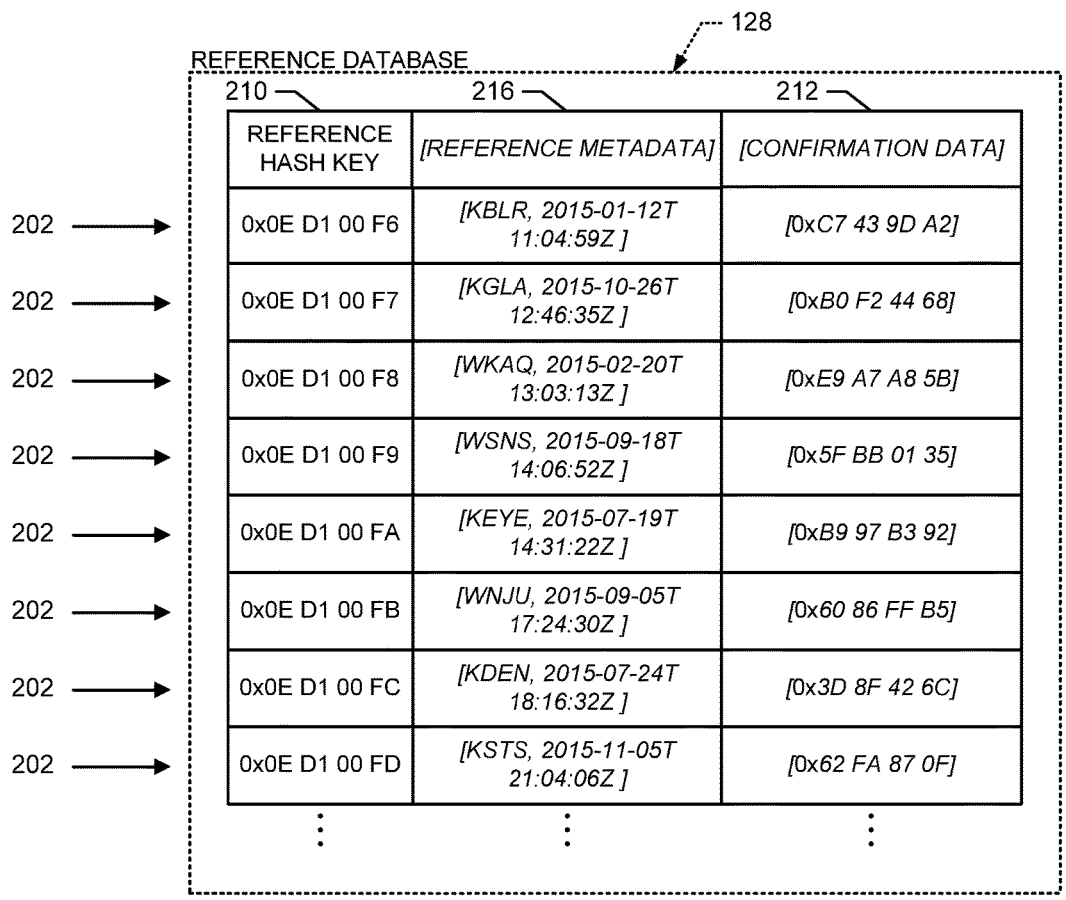
FIGS. 3A and 3B illustrate example configurations of the reference database of FIG. 1 that may be used to store reference metadata in association with reference hash keys of corresponding media.
Figure 3B:
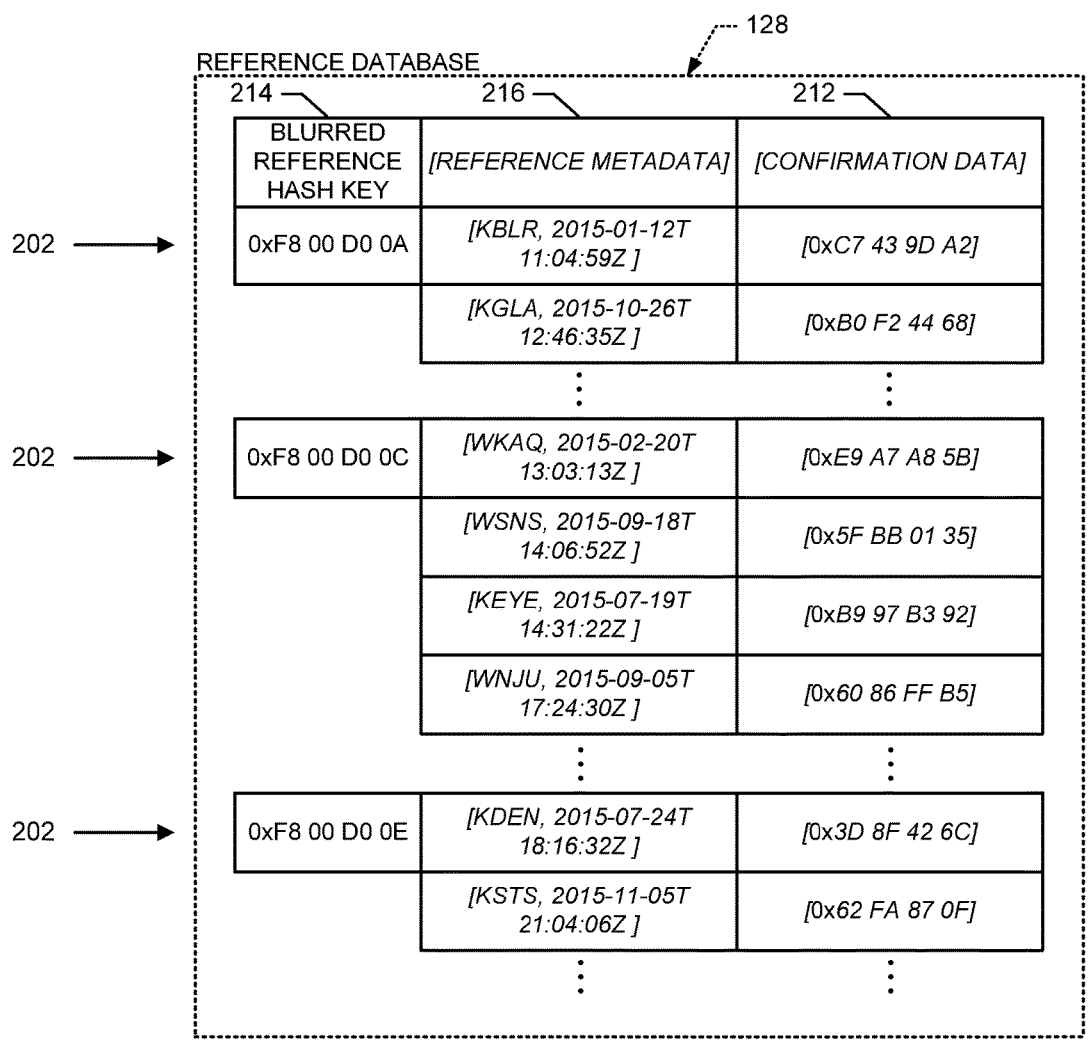

The example reference generator 208 receives or retrieves the blurred reference hash keys 214 and the reference confirmation data 212. The example reference generator 208 generates the example reference records 202 that associate the blurred reference hash key 214 to corresponding reference media metadata 216 and the corresponding reference confirmation data 212. FIGS. 3A and 3B illustrate examples of the reference records 202 stored in the reference database 128. In the example illustrated in FIG. 3A, the hash key modifier 206 does not apply the blurring function to the reference hash key 210. As such, the example reference records 202 has a one-to-one relationship between one of the reference hash keys 210, one set of reference metadata 216 (e.g., a media ID, a station ID, a station call sign, a timestamp corresponding to a portion of the media 104, etc.) and the confirmation datum 212.

In the example illustrated in FIG. 3B, the hash key modifier 206 applies the blurring function to the reference hash key 210. As such, in the illustrated example, a single blurred reference hash key 214 can be associated with multiple pairs of reference metadata 216 and confirmation data 212. For example, the blurred reference hash key 214 of "0xF8 00 D0 0A" may be associated with (a) the pair of reference metadata 216 and confirmation data 212 including "KBLR, 2015-01-12T11:04:59Z" and "0xC7 43 9D A2" respectively, and (b) the pair of reference metadata 216 and confirmation data 212 including "KGLA, 2015-10-26T12:46:35Z" and "0xB0 F2 44 68" respectively. In the example illustrated in FIG. 3B, the number of least significant bits blurred by the hash key modifier 206 and the number of bits in the reference hash key 210, increase a likelihood that multiple portions of the media 104 will have a reference hash key 210 that, when blurred, corresponds to the same blurred reference hash key 214.

While an example manner of implementing the example reference hash key generator 130 of FIG. 1 is illustrated in FIG. 2, one or more of the elements, processes and/or devices illustrated in FIG. 2 may be combined, divided, re-arranged, omitted, eliminated and/or implemented in any other way. Further, the example hybrid hash key generator 204, the example hash key modifier 206, the example reference generator 208 and/or, more generally, the example reference hash key generator 130 of FIG. 1 may be implemented by hardware, software, firmware and/or any combination of hardware, software and/or firmware. Thus, for example, any of the example hybrid hash key generator 204, the example hash key modifier 206, the example reference generator 208 and/or, more generally, the example reference hash key generator 130 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example hybrid hash key generator 204, the example hash key modifier 206, and/or the example reference generator 208 is/are hereby expressly defined to include a tangible computer readable storage device or storage disk such as a memory, a digital versatile disk (DVD), a compact disk (CD), a Blu-ray disk, etc. storing the software and/or firmware. Further still, the example reference hash key generator 130 of FIG. 1 may include one or more elements, processes and/or devices in addition to, or instead of, those illustrated in FIG. 2, and/or may include more than one of any or all of the illustrated elements, processes and devices.

Figure 4:
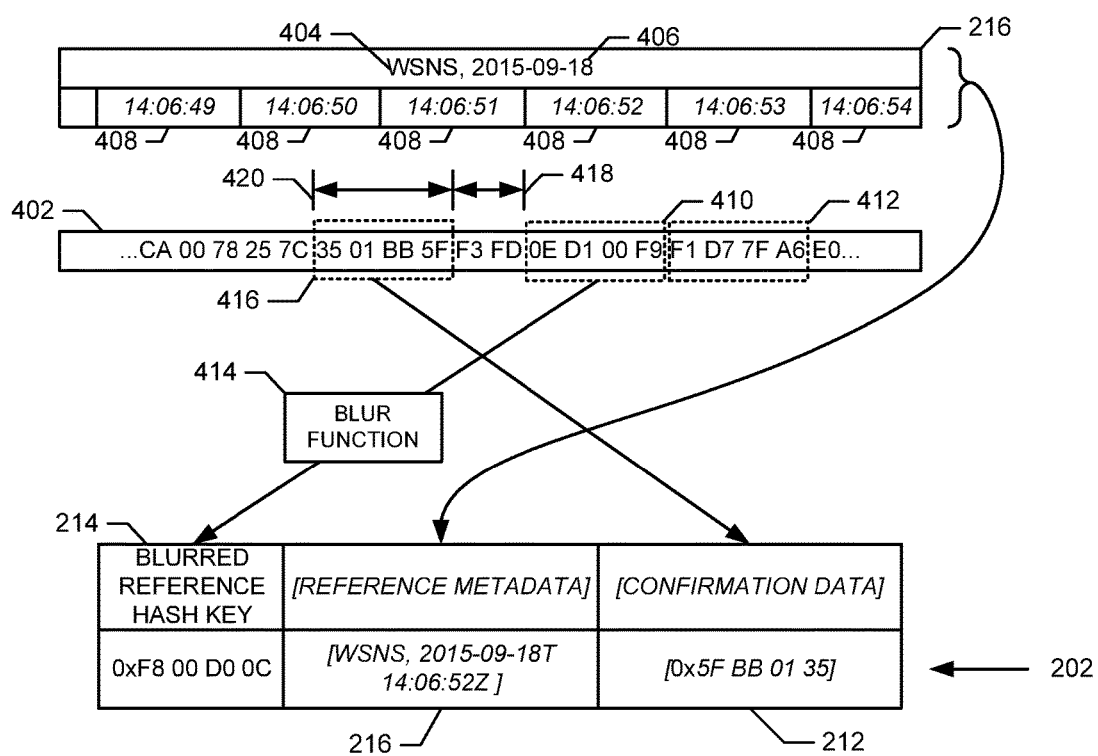
FIG. 4 illustrates an example diagram that depicts generating the example reference records of FIGS. 3A and/or 3B.

FIG. 4 illustrates an example diagram that depicts an example manner of how the example reference records 202 of FIGS. 2, 3A and/or 3B may be generated (e.g. by the reference hash key generator 130 of FIGS. 1 and 2). The example illustrated in FIG. 4 depicts a data stream 402 that includes the samples of the reference media 132 (FIGS. 1 and 2) that are analyzed by the reference hash key generator 130. The illustrated example also depicts the media metadata 216 chronologically corresponding to the data stream 402. In some examples, the data stream 402 may be stored in a buffer of the hybrid hash key generator 204 (FIG. 2). In the illustrated example, the metadata 216 includes a media source identifier 404, a date 406, and timestamps 408. The example media source identifier 404 is a value (e.g., a call sign, a television channel number, a radio station tuning frequency, a media stream URL, etc.) that identifies the entity (e.g., broadcaster, streaming media service, producer, etc.) that is making the media 104 available. The example hybrid hash key generator 204 analyzes the samples of the reference media 132 and produces the example data stream 402 which includes hashed values of the samples.

The example hybrid hash key generator 204 selects a first portion 410 of the data stream 402 corresponding to a timestamp 408 of interest to be a reference hash key 210 (FIG. 2). For example, to generate a reference hash key 210 corresponding to a first time, the hybrid hash key generator 204 may select the first portion 410 having a value of 0xF9 00 D1 0E corresponding to the timestamp 408 of 14:06:52. As another example, to generate a reference hash key 210 corresponding to a second time, the hybrid hash key generator 204 may select an additional first portion 412 with a value of 0xA6 7F D7 F1 corresponding to the timestamp 408 of 14:06:53. In the illustrated example, the hash key modifier 206 (FIG. 2) applies the blurring function 414 to transform the reference hash key 210 into the blurred reference hash key 214.

In the illustrated example, the hybrid hash key generator 204 selects a second portion 416 of the example data stream 402 to be the reference confirmation data 212. The example location of the second portion 416 in the data stream 402 is determined by an offset 418 and a size 420. The example offset 418 is a value, in bits, that defines the location of the second portion 416 relative to the first portion 410. For example, an offset of sixteen would locate the start of the second portion 416 sixteen bits (two bytes) of the data stream 402 chronologically after the first portion 410. In some examples, the offset 418 may be negative. For example, if the offset 418 is negative sixteen, the sixteen bits (two bytes) of the first portion 410 would be included in the second portion 416. The example size 420 defines a quantity of bits that are included in the second portion 416. In some examples, the size 420 of the second portion 416 is a percentage (e.g., 25%, 50%, etc.) of the size of the first portion 410. For example, if the size 420 of the second portion 416 is 25% of the size of the first portion 410, and the first portion 410 includes 40 bits, the size 420 of the second portion 416 would be 10 bits. Alternatively, in some examples, the size 420 of the second portion 416 is a multiple (e.g., 1.25, 1.5, 2, etc.) of the size of the first portion 410. For example, if the size 420 of the second portion 416 is 1.5 times the size of the first portion 410 and the first portion 410 includes 40 bits, the size 420 of the second portion 416 would be 60 bits. In the illustrated example, the example reference generator 208 (FIG. 10) generates the reference records 202 by associating the blurred reference hash key 214, the reference metadata 216 corresponding to the blurred reference hash key 214, and the reference confirmation data 212.

Figure 5:
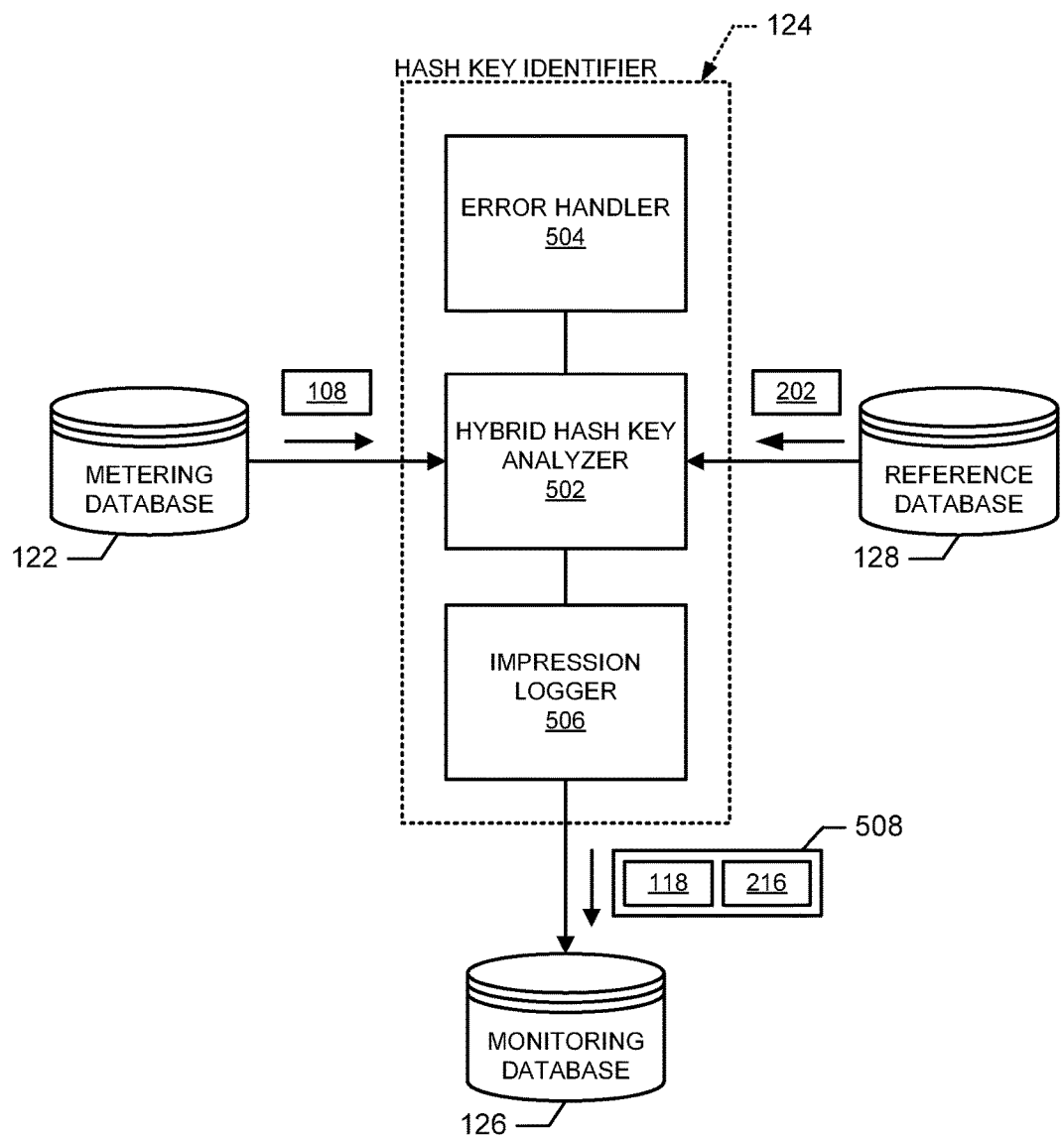
FIG. 5 illustrates an example implementation of the example hash key identifier of FIG. 1 which may be used to compare metered hash keys with reference hash keys to generate a monitoring report and/or to store impressions in a monitoring database.

FIG. 5 illustrates an example implementation of the example hash key identifier 124 of FIG. 1 which may be used to compare the exposure records 108 with the reference records 202 to generate a monitoring report and/or to store impressions in the monitoring database 126. The hash key identifier 124 of the illustrated example includes an example hybrid hash key analyzer 502, an example error handler 504, and an example impression logger 506. The example hybrid hash key analyzer 502 of the illustrated example retrieves the exposure records 108 from the example metering database 122 Initially, to generate an impression, the example hybrid hash key analyzer 502 queries the reference database 128 for the reference record(s) 202 that include(s) the reference hash keys 210 (FIGS. 2 and 3A) and/or the blurred reference hash keys 214 (FIGS. 2, 3B, and 4) that match the metered hash key 114 (FIG. 1) of the exposure record 108.

In the illustrated example, the hybrid hash key analyzer 502 compares the metered confirmation data 116 (FIG. 1) corresponding to the metered hash key 114 to the reference confirmation data 212 (FIGS. 2, 3A, 3B, and 4) of the retrieved reference record(s) 202. In some examples in which the metered hash key 114 is blurred (e.g., by the meter 100 of FIG. 1) and the blurred reference hash key 214 is blurred, the query of the reference database 128 may return more than one reference record 202. Also, in some examples, the query of the reference database 128 may return more than one reference record 202 because the samples of more than one of the media 104 (FIG. 1) may, by coincidence, produce the same reference hash key 210. If the metered confirmation data 116 matches the reference confirmation data 212 of one of the retrieved reference records 202, the example hybrid hash key analyzer 502 sends the example exposure record 108 and the corresponding reference record 202 to the example impression logger 506.

In the illustrated example, if the metered confirmation data 116 does not match the reference confirmation data 212 of one of the retrieved reference records 202, the error handler 504 determines an error level between the metered confirmation data 116 and the reference confirmation data 212 of each of the retrieved reference record 202. In some examples, to generate the error level (e), the error handler 504 performs a bitwise comparison (e.g., a bitwise exclusive OR, etc.) between the metered confirmation data 116 and the reference confirmation data 212 using Equation 1 below.

$$e = \text{BitCount}(C_m \oplus C_r) \quad \text{Equation 1}$$

In Equation 1 above, $C_m$ is the metered confirmation data 116, $C_r$ is the reference confirmation data 212, and the BitCount( ) function returns the number of ones in a binary number. For example, as shown in Table 1 below, if the metered confirmation data 116 is 0xA6 00 85 69 and if the reference confirmation data 212 is 0xA2 10 85 E9, the error level (e) is 3 (BitCount(0xA6008569⊕0xA21085E9)=3) because two bit positions have non-matching values.

TABLE 1

EXAMPLE ERROR LEVEL (e) CALCULATION

| | Hexadecimal | Binary |
|---|---|---|
| | 0xA6008569 | 1010 0110 0000 0000 1000 0101 0110 1001 |
| ⊕ | 0xA21085E9 | 1010 0010 0001 0000 1000 0101 1110 1001 |
| | 0x04100080 | 0000 0100 0001 0000 0000 0000 1000 0000 |

The example error handler 504 selects one of the retrieved reference records 202 corresponding to the corresponding reference confirmation data 212 having an error level that is the smallest of the calculated error levels that is less than an error threshold. The example error level is indicative of the number of bits that are different between the reference confirmation data 212 and the metered confirmation data 116. In some examples, the error threshold is be set to a percentage (e.g. 5%, 10%, etc.) of the bit length of the metered hash key 114. For example, an error threshold of 4 bits may be selected for a 40-bit metered hash key 114. Table 2 below illustrates an example of reference confirmation data 212 and the associated error levels (e).

TABLE 2

EXAMPLE ERROR LEVELS (e) CALCULATED FOR EXAMPLE REFERENCE RECORDS

| | Metered Confirmation Data 0x6B BE 95 F0 | |
|---|---|---|
| | Reference Confirmation Data | Error Level (e) |
| First Reference Record | 0x7B BB 95 F0 | 2 bits |
| Second Reference Record | 0x6F BE 9D D8 | 4 bits |
| Third Reference Record | 0x9C 28 71 A3 | 19 bits |

In the example illustrated in Table 2 above, the error handler 504 would select the First Reference Record because the Error Level (e) for the First Reference Record is the lowest error level.

In the illustrated example of FIG. 5, the impression logger 506 retrieves or otherwise receives the exposure record 108 and the selected reference record 202 from the example hybrid hash key analyzer 502. The impression logger 506 creates an impression record 508 by associating the meter ID 118 and the timestamp 120 of the exposure record 108 with the reference metadata 216 of the reference record 202. In the illustrated example, the impression logger 506 stores the impression record 508 into the monitoring database 126. In some examples, the example impression logger 506 credits the portion of the media represented by the reference metadata 216. In some such examples, to assign credit to the portion of the media represented by the reference metadata 216, the example impression logger 506 stores a value, sets a flag, and/or stores a tag in association with the impression record indicative of the portion of the media being exposed to the household represented by the meter ID 118.

While an example manner of implementing the example hash key identifier 124 of FIG. 1 is illustrated in FIG. 5, one or more of the elements, processes and/or devices illustrated in FIG. 5 may be combined, divided, re-arranged, omitted, eliminated and/or implemented in any other way. Further, the example hybrid hash key analyzer 502, the example error handler 504, the example impression logger 506, and/or, more generally, the example hash key identifier 124 of FIG. 1 may be implemented by hardware, software, firmware and/or any combination of hardware, software and/or firmware. Thus, for example, any of the example hybrid hash key analyzer 502, the example error handler 504, the example impression logger 506, and/or, more generally, the example hash key identifier 124 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example hybrid hash key analyzer 502, the example error handler 504, and/or the example impression logger 506 is/are hereby expressly defined to include a tangible computer readable storage device or storage disk such as a memory, a digital versatile disk (DVD), a compact disk (CD), a Blu-ray disk, etc. storing the software and/or firmware. Further still, the example hash key identifier 124 of FIG. 1 may include one or more elements, processes and/or devices in addition to, or instead of, those illustrated in FIG. 5, and/or may include more than one of any or all of the illustrated elements, processes and devices.

Figure 6:
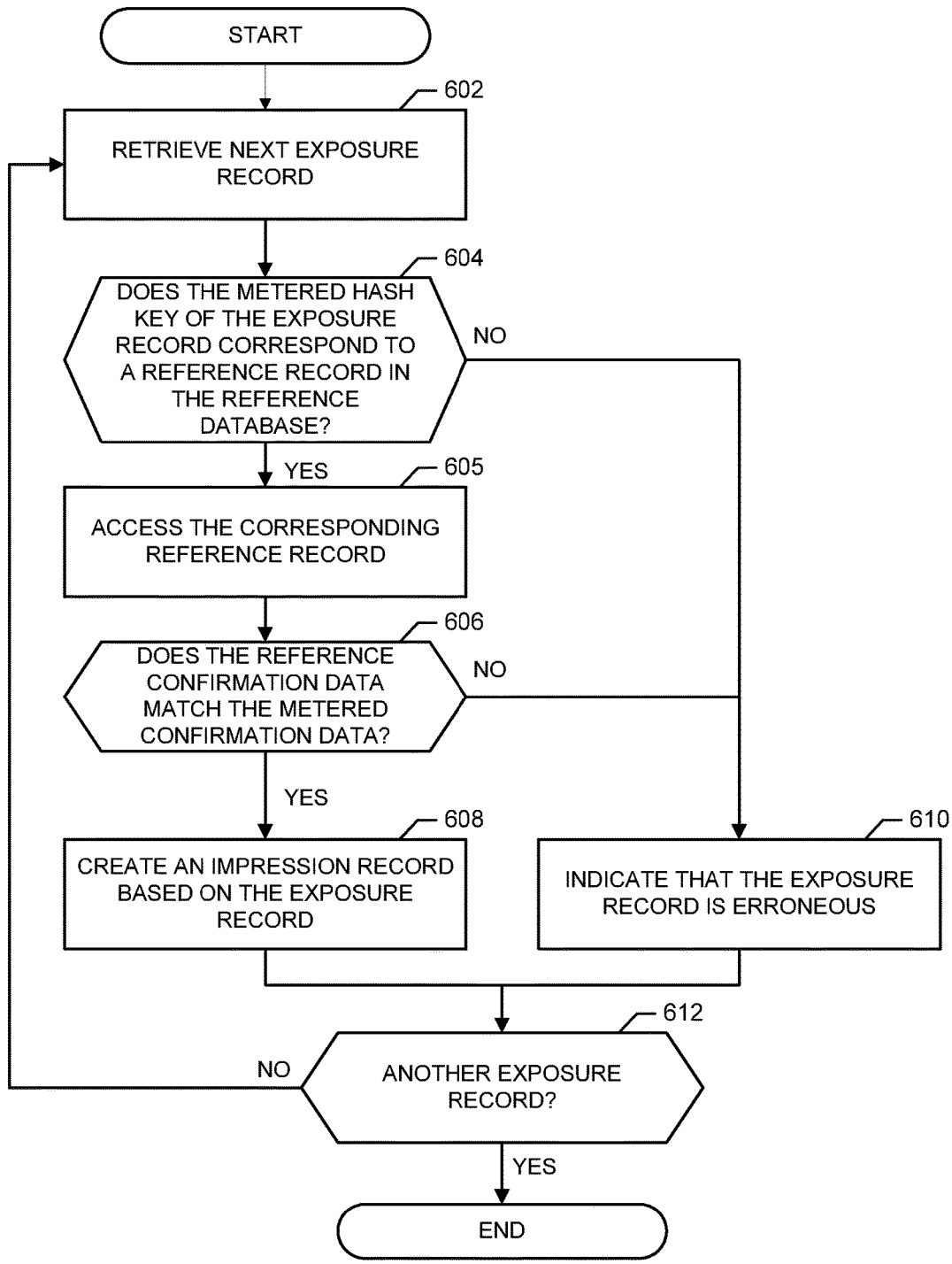
FIG. 6 is a flow diagram of example machine readable instructions that may be executed to implement the hash key manager of FIGS. 1 and/or 5 to compare metered hash keys to reference hash keys.
Figure 7:
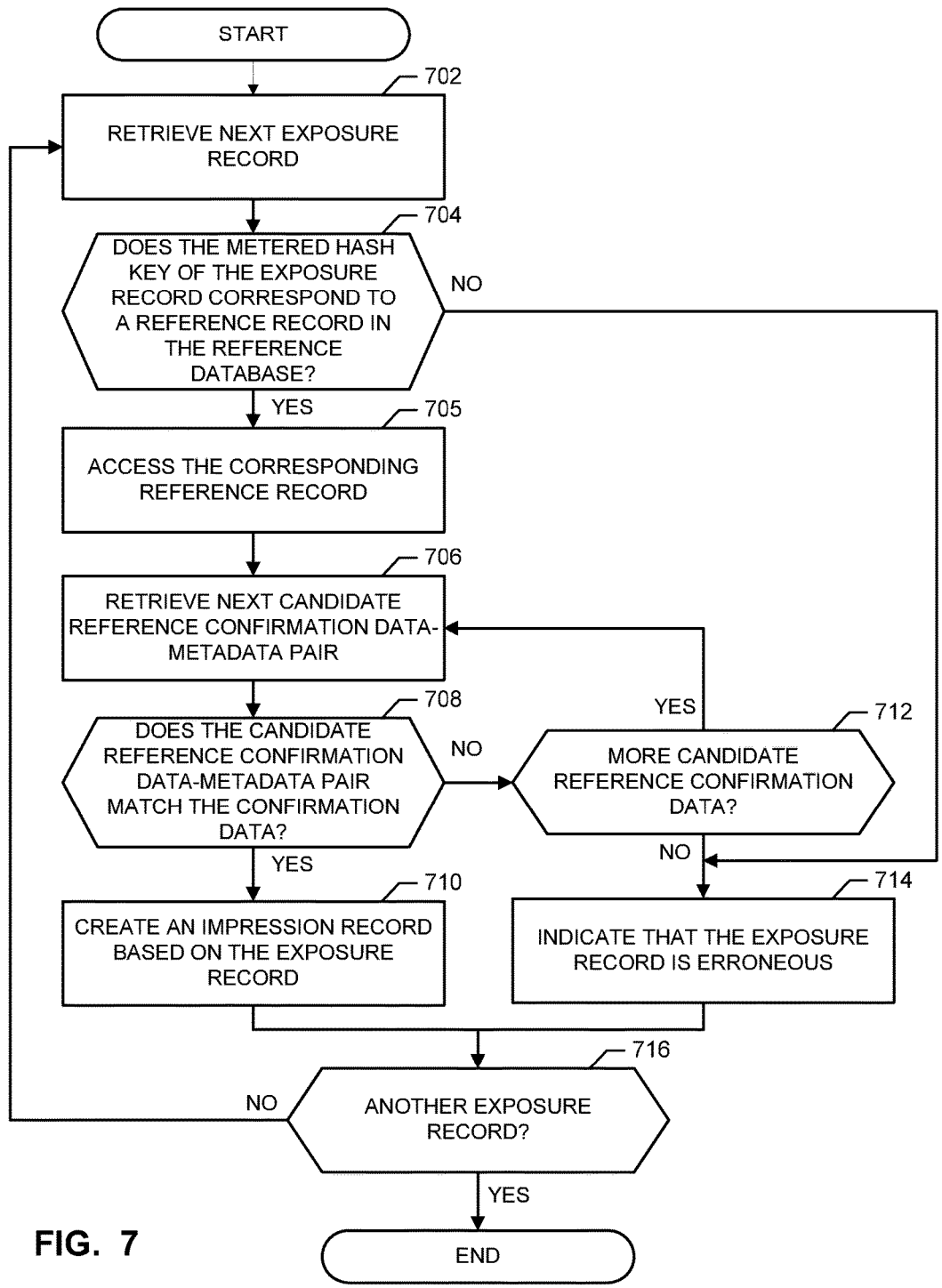
FIG. 7 is another flow diagram of example machine readable instructions that may be executed to implement the hash key manager of FIGS. 1 and/or 5 to compare metered hash keys to reference hash keys.
Figure 8:
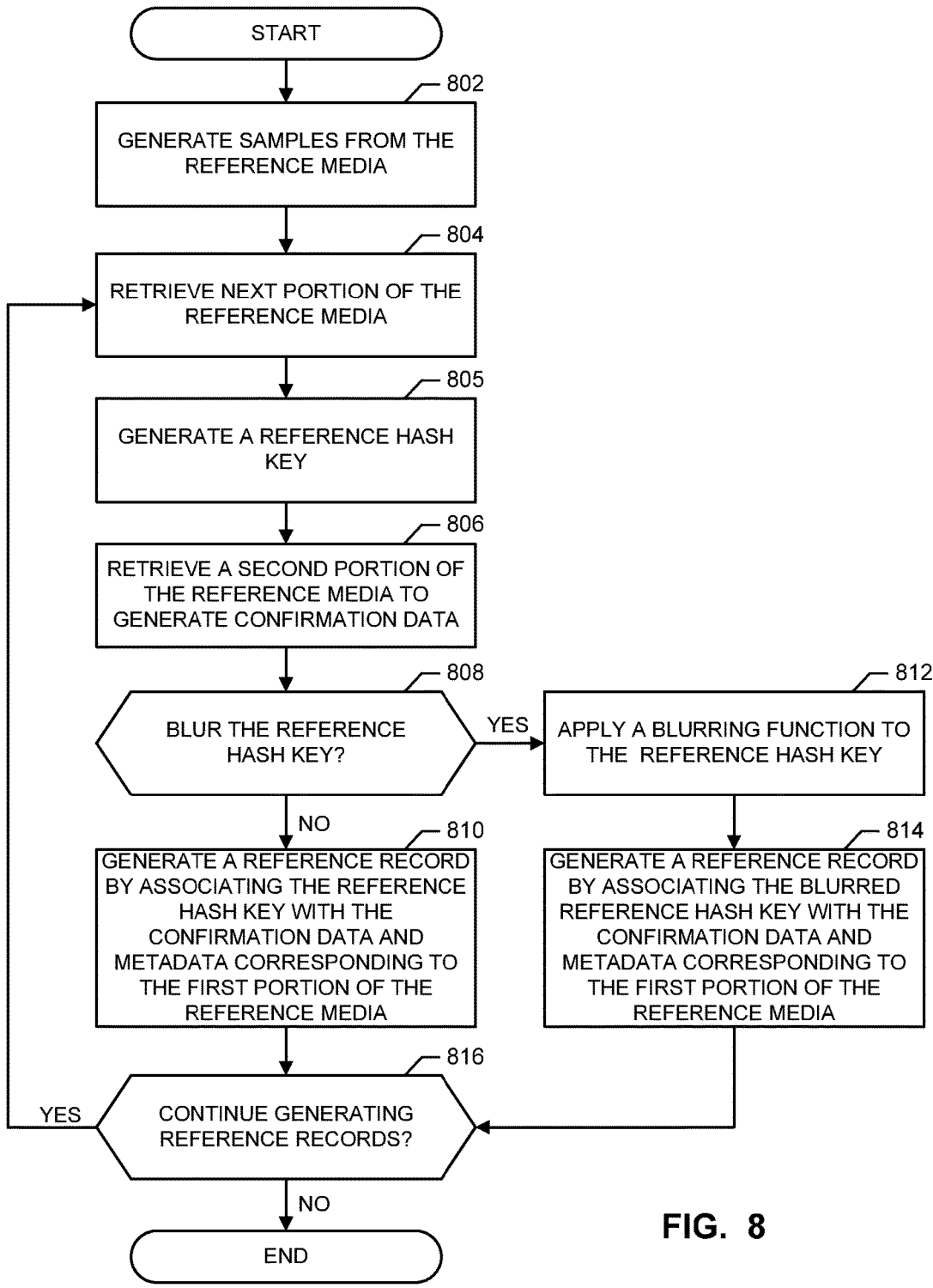
FIG. 8 is a flow diagram of example machine readable instructions that may be executed to implement the reference hash key generator of FIGS. 1 and/or 2 to generate reference hybrid-hash keys.

Flowcharts representative of example machine readable instructions for implementing the hash key identifier 124 of FIGS. 1 and 5 are shown in FIGS. 6 and 7. A flowchart representative of example machine readable instructions for implementing the reference hash key generator 130 of FIGS. 1 and 2 is shown in FIG. 8. In this example, the machine readable instructions comprise programs for execution by a processor such as the processor 912 shown in the example processor platform 900 discussed below in connection with FIG. 9. The program may be embodied in software stored on a tangible computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example programs are described with reference to the flowcharts illustrated in FIGS. 6, 7, and/or 8, many other methods of implementing the example hash key identifier 124 and/or the example reference hash key generator 130 may alternatively be used. For example, the order of execution of the blocks may be changed, and/or some of the blocks described may be changed, eliminated, or combined.

As mentioned above, the example processes of FIGS. 6, 7, and/or 8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 6, 7, and/or 8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 6 is a flow diagram of example machine readable instructions that may be executed to implement the hash key identifier 124 of FIGS. 1 and/or 5 to compare the exposure records 108 (FIGS. 1 and 5) to the reference records 202 (FIGS. 2, 3A, 3B, and 4). In the example process of FIG. 6, the metered hash keys 114 (FIGS. 1 and 5) and the reference hash keys 210 (FIGS. 2 and 3A) are not blurred. Initially, at block 602, the hybrid hash key analyzer 502 (FIG. 5) retrieves the next metered exposure record 108 from the metering database 122 (FIGS. 1 and 5). At block 604, the hybrid hash key analyzer 502 determines whether the metered hash key 114 of the metered exposure record 108 retrieved at block 602 corresponds to one of the reference records 202 in the reference database 128. For example, the example hybrid hash key analyzer 502 may query the reference database 128 using the metered hash key 114. In such examples, if the reference database 128 returns a reference record 202, the hybrid hash key analyzer 502 determines that the metered hash key 114 does substantially match or correspond to a reference record 202 in the reference database 128. If the metered hash key 114 corresponds to one of the reference records 202, program control advances to block 605. Otherwise, if the metered hash key 114 does not correspond to one of the reference records 202, program control advances to block 610. At block 605, the hybrid hash key analyzer 502 accesses the reference record 202 from the reference database 128 corresponding to the metered hash key 114.

At block 606, the example error handler 504 (FIG. 5) determines whether the metered confirmation data 116 (FIG. 1) of the metered exposure record 108 retrieved at block 602 matches the reference confirmation data 212 (FIGS. 2, 3A, 3B, and 4) of the reference record 202 accessed at block 605. In some examples, the error handler 504 performs a bitwise comparison of the metered confirmation data 116 and the reference confirmation data 212 to generate an error level (e). In some such examples, the error handler 504 determines that the metered confirmation data 116 matches the reference confirmation data 212 if the error level (e) satisfies (e.g., is less) than an error threshold. If the metered confirmation data 116 matches the reference confirmation data 212, program control advances to block 608. Otherwise, if the metered confirmation data 116 does not match the reference confirmation data 212, program control advances to block 610.

At block 608, the example impression logger 506 (FIG. 5) generates an impression record based on the metered exposure record 108. For example, the impression logger 506 associates the meter ID 118 (FIG. 1) corresponding to the metered exposure record 108 with the reference metadata 216 of the reference record 202. At block 610, the example impression logger 1306 indicates that the metered exposure record 108 is erroneous. In some examples, the example impression logger 506 marks (e.g., sets a flag, etc.) the metered exposure record 108 as erroneous so that the metered exposure record 108 is not used to generate an impression record (e.g., the impression record 508 of FIG. 5). Alternatively, in some examples, the impression logger 506 discards the metered exposure record 108. At block 612, the hybrid hash key analyzer 502 determines whether there is another exposure record 108 to analyze. If there is another metered exposure record 108 to analyze, program control returns to block 602 to retrieve the next exposure record 108. Otherwise, if there is not another metered exposure record 108 to analyze, the example program of FIG. 6 ends.

FIG. 7 is a flow diagram of example machine readable instructions that may be executed to implement the hash key identifier 124 of FIGS. 1 and/or 5 to compare metered hash keys 114 (FIG. 1) corresponding to the metered exposure records 108 (FIGS. 1 and 5) to blurred reference hash keys 214 (FIGS. 2, 3B, and 4) in the reference database 128 (FIG. 1). Initially, at block 702, the hybrid hash key analyzer 502 (FIG. 5) retrieves the next metered exposure record 108 from the metering database 122 (FIG. 1). At block 704, the hybrid hash key analyzer 502 determines whether the metered hash key 114 of the metered exposure record 108 retrieved at block 702 corresponds to one of the reference records 202 in the reference database 128. For example, the example hybrid hash key analyzer 502 may query the reference database 128 using the metered hash key 114. In such examples, if the reference database 128 returns a reference record 202, the hybrid hash key analyzer 502 determines that the metered hash key 114 does substantially match or correspond to a reference record 202 of the reference database 128. If the metered hash key 114 corresponds to one of the reference records 202, program control advances to block 705. Otherwise, if the metered hash key 114 does not correspond to one of the reference records 202, program control advances to block 714. At block 705, the hybrid hash key analyzer 502 accesses the reference record 202 from the reference database 128 corresponding to the metered hash key 114.

Because the blurred reference hash key 214 accessed at block 705 may be associated with more than one portion of the media 104 and/or portion(s) of different media, the reference record 202 accessed at block 705 may be associated with multiple candidate reference confirmation data-reference metadata pairs ((e.g., the metadata 216 and the reference confirmation data 212 of FIG. 4). At block 706, the example error handler 504 retrieves the next candidate reference confirmation data-reference metadata pair.

At block 708, the example error handler 504 determines whether the metered confirmation data 116 corresponding to the metered exposure record 108 retrieved at block 702 matches the candidate reference confirmation data 212 retrieved at block 706. For example, the error handler 504 may perform a bitwise comparison between the metered confirmation data 116 of the metered exposure record 108 selected at block 702 and the candidate reference confirmation data 212 selected at block 706 to generate an error level (e). In such examples, the error handler 504 determines that the metered confirmation data 116 matches the candidate reference confirmation data 212 if the error level satisfies (e.g., is less than) an error threshold (e). If the metered confirmation data 116 matches the candidate reference confirmation data 212, program control advances to block 710. Otherwise, if the metered confirmation data 116 does not match the candidate reference confirmation data 212, program control advances to block 712. At block 710, the example impression logger 506 (FIG. 5) generates an impression record based on the metered exposure record 108. For example, the impression logger 506 associates the meter ID 118 (FIG. 1) of the metered exposure record 108 with the reference metadata 216 associated with the candidate reference confirmation data 212 determined to be matching at block 708. Program control then advances to block 716.

At block 712, the example error handler 504 determines whether the reference record 202 retrieved at block 714 is associated with more candidate reference confirmation data 212. If the reference record 202 is associated with more candidate reference confirmation data 212, program control returns to block 706. Otherwise, if the reference record 2002 is not associated with more candidate reference confirmation data 212, program control advances to block 714.

At block 714, the example impression logger 506 indicates that the metered exposure record 108 is erroneous. In some examples, the example impression logger 506 marks (e.g., sets a flag, etc.) the metered exposure record 108 as erroneous so that the metered exposure record 108 is not used to generate an impression record (e.g., the impression record 508 of FIG. 5). Alternatively, in some examples, the impression logger 506 discards the metered exposure record 108. At block 716, the hybrid hash key analyzer 502 determines whether there is another metered exposure record 108 to analyze. If there is another metered exposure record 108 to analyze, program control returns to block 702 to retrieve the next exposure record 108. Otherwise, if there is not another metered exposure record 108 to analyze, the example program of FIG. 7 ends.

FIG. 8 is a flow diagram of example machine readable instructions that may be executed to implement the reference hash key generator 130 of FIGS. 1 and/or 2 to generate reference records 202 (FIGS. 2, 3A, 3B, and 4). Initially, at block 802, the hybrid hash key generator 204 (FIG. 2) generates samples of the reference media 132 (FIGS. 1, 2, and 4). In some examples, the hybrid hash key generator 1004 continuously applies a hash function to the samples of the reference media 132 and places the hashed samples of the reference media 132 into, for example, a circular buffer.

At block 804, the example hybrid hash key generator 204 selects a first portion (e.g., the first portion 410 of FIG. 4) of the samples of the reference media 132. At block 805, the example hybrid hash key generator 204 generates a reference hash key 210 based on the first portion 410 of the samples of the reference media 132 selected at block 804. For example, if the samples of the reference media 132 have a length of 8-bits and the reference hash key is to have a length of 40-bits, the hybrid hash key generator 204 selects the next five samples (e.g., sample $N_0$ through $N_4$) of the reference media 132 as the reference hash key 1010. When the next reference hash key 210 is generated, the example hybrid hash key generator 204 selects five additional samples of the reference media 132, some of which may overlap with the previously generated reference hash key 210. For example, a first reference hash key (k) 210 may include samples $N_{10}$ through $N_{14}$, and a second reference hash key (k+1) 210 may include samples $N_{11}$ through $N_{15}$.

At block 806, the example hybrid hash key generator 204 selects a second portion (e.g., the second portion 416 of FIG. 4) of the samples of the reference media 132 to generate reference confirmation data 212 (FIGS. 2, 3A, 3B and 4). The example hybrid hash key generator 204 selects the second portion 416 based on an offset (e.g., the offset 418 of FIG. 4) and a size (e.g., the size 420 of FIG. 4) set by the AME 102 (FIG. 1). For example if the offset 416 is −16 bits (−2 bytes), the size 420 is five bytes, and the reference hash key 210 was generated from samples $N_{12}$ through $N_{16}$, the confirmation data 212 is generated using samples $N_8$ through $N_{13}$.

At block 808, the example hash key modifier 204 (FIG. 2) determines whether to apply the blurring function to the reference hash key 210 generated at block 805. If the example hash key modifier 204 is to apply the blurring function to the reference hash key 210, program control advances to block 812. Otherwise, if the example hash key modifier 204 is not to apply the blurring function to the reference hash key 210, program control advances to block 810. At block 810, the example reference generator 208 (FIG. 2) generates a reference record 202 by associating the reference hash key 210 generated at block 805 with (i) reference metadata 216 corresponding to the first portion of the reference media 132 obtained at block 804 to generate the reference hash key 210, and (ii) the reference confirmation data 212 selected at block 806. For example, the reference hash key 210 may correspond to a station with the call sign WSNS, a date of Sep. 18, 2015, and a timestamp of 14:06:52.0825.

At block 812, the example hash key modifier 204 applies the blurring function to the reference hash key 210 to generate a blurred reference hash key 214 (FIGS. 2, 3B and 4). To apply the blurring function in the illustrated example, the example hash key modifier 204 sets a number of the least significant bits of each byte of the reference hash key 210 to zero. For example, if the reference hash key 210 is 0xC3 41 D2 52 (binary: 11000011 01000001 11010010 01010010) and the two least significant bits of each byte are set to zero by the blurring function, the blurred reference hash key 214 is 0xC0 40 D0 50 (binary: 11000000 01000000 11010000 01010000). Alternatively, if only the least significant bit of each byte is set to zero by the blurring function, the blurred reference hash key 214 is 0xC2 40 D2 52 (binary: 11000010 01000000 11010010 01010010). At block 814, the example reference generator 208 generates a reference record 202 by associating the blurred reference hash key 214 generated at block 812 with (i) reference metadata 216 corresponding to the first portion of the reference media 132 used to generate the reference hash key 210, and (ii) the reference confirmation data 212 selected at block 806.

At block 816, the example hybrid hash key generator 204 determines whether another reference record 202 is to be generated. For example, if all the reference hash keys 210 for the reference media 132 have been generated (e.g., the hybrid hash key generator 204 has reached the end of the reference media 132), the hybrid hash key generator 204 determines that another record 202 is not to be generated. If another reference record 202 is to be generated, program control returns to block 804. Otherwise, if another reference hash key 210 or blurred reference hash key 214 is not to be generated, the program ends.

Figure 9:
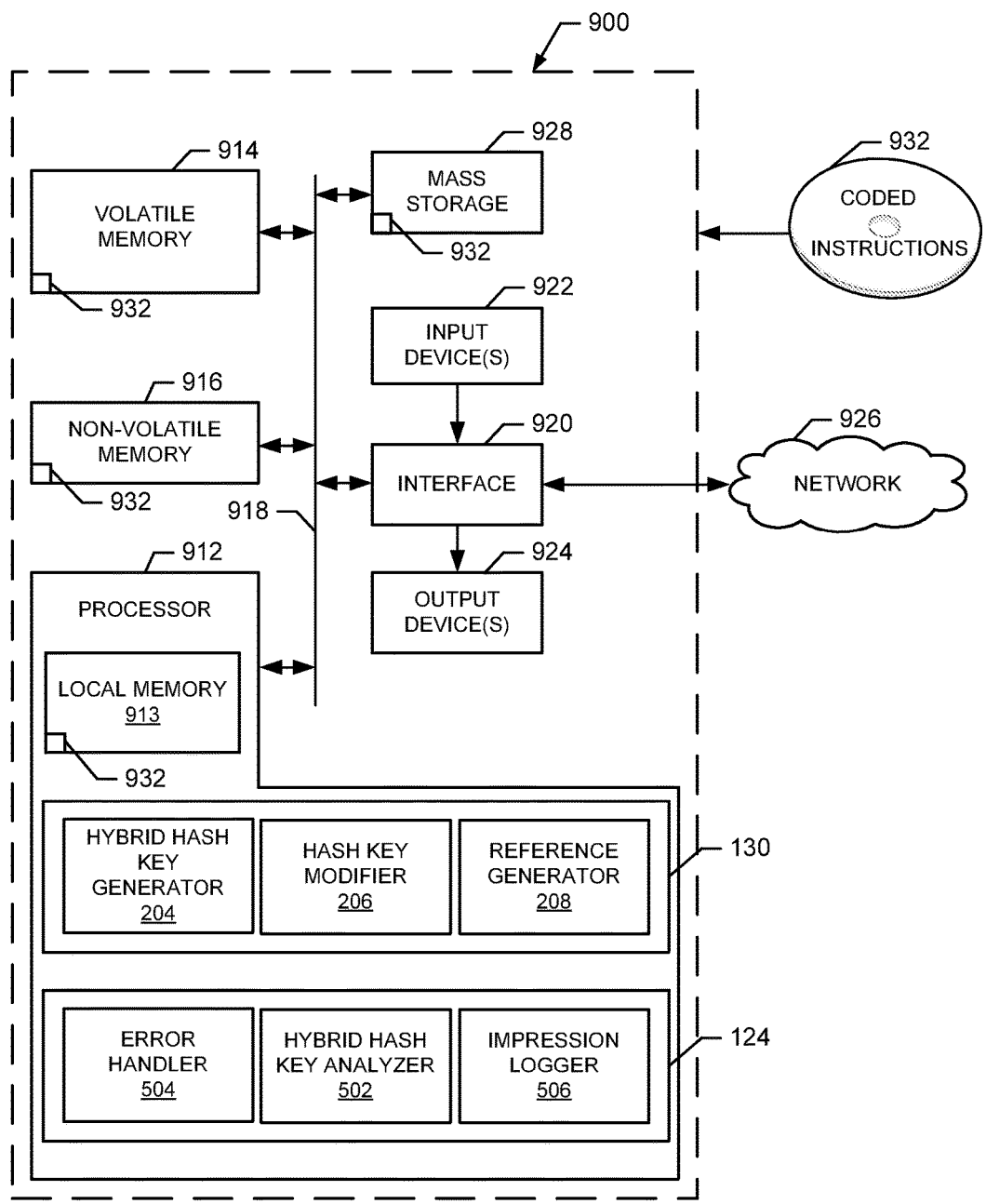
FIG. 9 is a block diagram of an example processor system that may execute any of the machine readable instructions represented by FIGS. 6, 7, and/or 8 to implement the apparatus of FIGS. 2 and/or 5.

FIG. 9 is a block diagram of an example processor platform 900 capable of executing the instructions of FIGS. 6, 7 and/or 8 to implement the hash key identifier 124 of FIGS. 1 and 5, and/or the reference hash key generator 130 of FIGS. 1 and 2. The processor platform 900 can be, for example, a server, a personal computer, a workstation, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer. In the illustrated example, the processor 912 is structured to include the example hybrid hash key analyzer 502, the example error handler 504, and the example 505. Additionally or alternatively, in some examples, the processor 912 is structured to include the example hybrid hash key generator 204, the example hash key modifier 206, and the example reference generator 208.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a printer). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

Coded instructions 932 of FIGS. 6, 7 and/or 8 may be stored in the mass storage device 928, in the volatile memory 914, in the non-volatile memory 916, and/or on a removable tangible computer readable storage medium such as a CD or DVD.

From the foregoing, it will appreciate that examples have been disclosed which allow error-tolerant identification of metered hash keys produced from media sources that introduce noise into the metered hash keys. Additionally, examples have been disclosed which generate reference records that include information pertaining to additionally portions of a medium. Examples have been disclosed which increase the accuracy of impression data and reduce processing (e.g., reduce the burden on a semiconductor based processor) required to perform a match and/or to adjust for erroneous and/or missing impression data. Moreover, because erroneous hash keys can be identified efficiently, search time in a database to identify media is reduced. Reducing search time saves processing resources and reduces the energy consumption required to perform media monitoring.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
   generating a reference hash key based on first samples of media, the first samples of the media corresponding to a portion of the media sampled in a buffer of a computing device;
   applying a blurring function to the reference hash key to generate a first blurred reference hash key, the blurring function setting at least one least significant bit of a value of the reference hash key, in at least one byte of the reference hash key, to zero, the first blurred reference hash key to match metered hash keys generated from degraded versions of the media;
   generating first confirmation data based on second samples of the media;
   storing the first blurred reference hash key in association with the first confirmation data and first reference data in a reference database, the first reference data representative of the portion of the media;
   receiving a first metered hash key and metered confirmation data associated with the first metered hash key;
   comparing the first metered hash key with blurred reference hash keys stored in the reference database, the blurred reference hash keys including the first blurred reference hash key; and
   crediting the portion of the media with an exposure when the first metered hash key matches the first blurred reference hash key stored in the reference database, and the metered confirmation data matches the first confirmation data stored in the reference database.

2. The method as defined in claim 1, wherein the second samples are offset by a number of bits from an end of the portion of the media.

3. The method as defined in claim 1, wherein the portion of the media overlaps a second portion of the media corresponding to the second samples.

4. The method as defined in claim 1, wherein the first blurred reference hash key is stored in association with second confirmation data that is associated with second reference data.

5. The method as defined in claim 1, further including creating a monitoring report providing at least one of advertisers, broadcasters or other entities access to at least one of an audience size for the media or a demographic composition for an audience of the media.

6. The method as defined in claim 1, wherein the degraded version of the media corresponds to at least one of a version of the media subjected to noise or a version of the media converted to a lossy format.

7. An apparatus comprising:
   a hybrid hash key generator to:
      generate a reference hash key based on first samples of media, the first samples of the media corresponding to a portion of the media sampled in a buffer of a computing device; and
      generate first confirmation data based on second samples of the media;
   a hash key modifier to apply a blurring function to the reference hash key to generate a first blurred reference hash key, the blurring function setting at least one least significant bit of a value of the reference hash key, in at least one byte of the reference hash key, to zero, the first blurred reference hash key to match metered hash keys generated from degraded versions of the media;
   memory to store the first blurred reference hash key in association with the first confirmation data and first reference data, the first reference data representative of the portion of the media;
   a hybrid hash key analyzer to:
      access a first metered hash key and metered confirmation data associated with the first metered hash key; and
      compare the first metered hash key with the first blurred reference hash key to determine whether to credit a portion of the media with an exposure; and
   a hash key identifier to credit the portion of the media with an exposure when the first metered hash key matches the first blurred reference hash key and the metered confirmation data matches the first confirmation data.

8. The apparatus as defined in claim 7, wherein the second samples are offset by a number of bits from an end of the portion of the media.

9. The apparatus as defined in claim 7, wherein the portion of the media overlaps with a second portion corresponding to the second samples.

10. The apparatus as defined in claim 7, wherein the first blurred reference hash key is stored in association with second confirmation data that is associated with second reference data.

11. The apparatus as defined in claim 7, wherein the hash key identifier creates a monitoring report providing at least one of advertisers, broadcasters or other entities access to at least one of an audience size for the media or a demographic composition for an audience of the media.

12. The apparatus as defined in claim 7, wherein the degraded version of the media corresponds to at least one of a version of the media subjected to noise or a version of the media converted to a lossy format.

13. A tangible computer readable storage medium comprising machine readable instructions that, when executed, cause a machine to at least:
   generate a reference hash key based on first samples of media, the first samples of the media corresponding to a portion of the media sampled in a buffer of a computing device;
   apply a blurring function to the reference hash key to generate a first blurred reference hash key, the blurring function setting at least one least significant bit of a value of the reference hash key, in at least one byte of the reference hash key, to zero, the first blurred reference hash key to match metered hash keys generated from degraded versions of the media;

generate first confirmation data based on second samples of the media;

store the first blurred reference hash key in association with the first confirmation data and first reference data in a reference database, the first reference data identifying the portion of the media;

receive a first metered hash key and metered confirmation data associated with the first metered hash key;

compare the first metered hash key with the blurred reference hash keys stored in the reference database, the blurred reference hash keys including the first blurred reference hash key; and credit the portion of the media with an exposure when the first metered hash key matches the first blurred reference hash key stored in the reference database, and the metered confirmation data matches the first confirmation data stored in the reference database.

14. The tangible computer readable storage medium as defined in claim 13, wherein the second samples are offset by a number of bits from an end of the portion of the media.

15. The tangible computer readable storage medium as defined in claim 13, wherein the portion of the media overlaps with a second portion corresponding to the second samples.

16. The tangible computer readable storage medium as defined in claim 13, wherein the first blurred reference hash key is stored in association with second confirmation data that is associated with second reference data.

17. The tangible computer readable storage medium as defined in claim 13, further including instructions that, when executed, cause a machine to at least create a monitoring report providing at least one of advertisers, broadcasters or other entities access to at least one of an audience size for the media or a demographic composition for an audience of the media.

18. The tangible computer readable storage medium as defined in claim 13, wherein the degraded version of the media corresponds to at least one of a version of the media subjected to noise or a version of the media converted to a lossy format.

* * * * *